Sept. 23, 1969     J. D. JOHNSON     3,468,538
WEIGHTED BILLIARD CUE
Filed Dec. 6, 1965
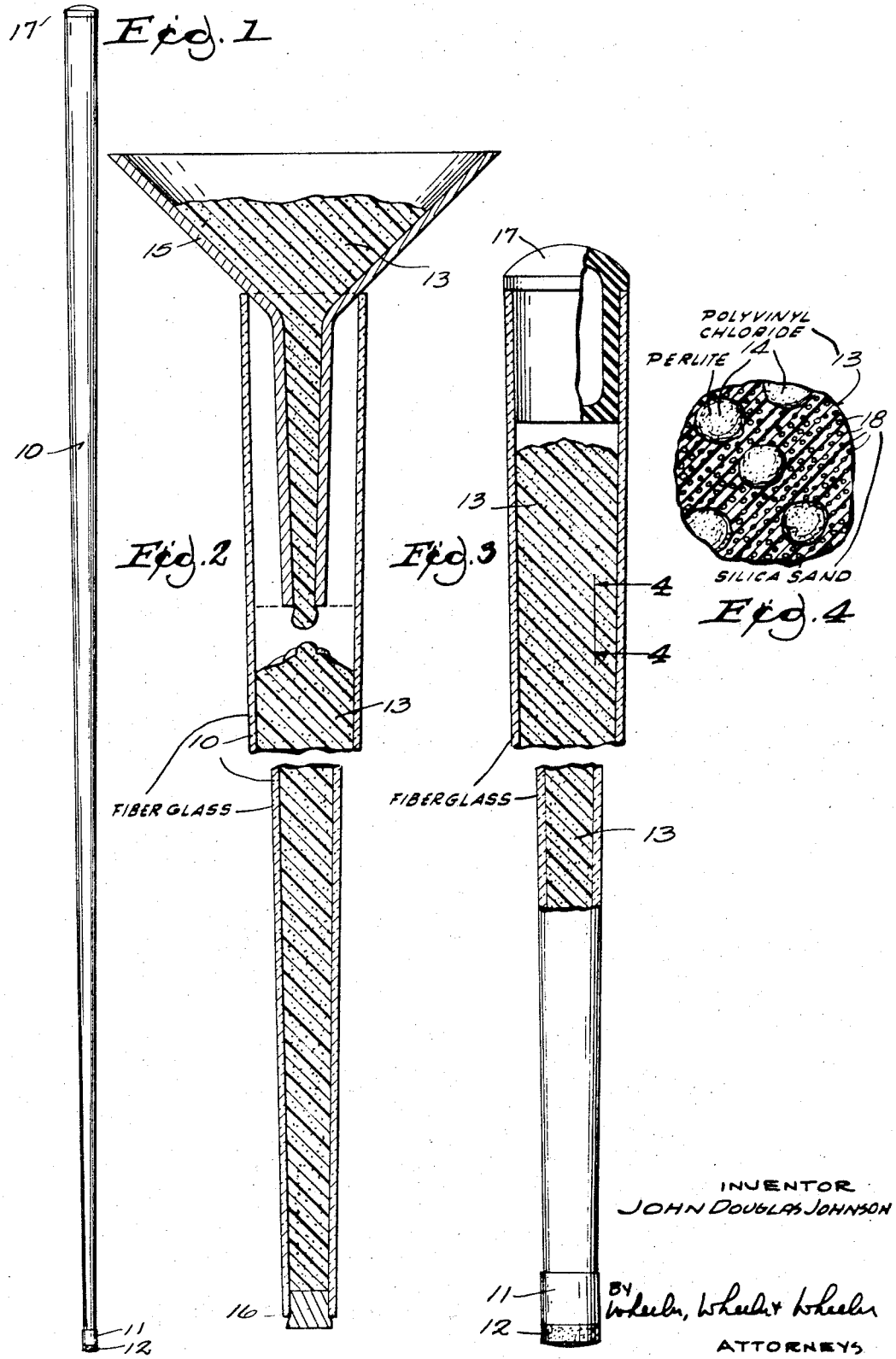

United States Patent Office 3,468,538
Patented Sept. 23, 1969

3,468,538
WEIGHTED BILLIARD CUE
John Douglas Johnson, Ironwood, Mich., assignor to Kodiak Corporation, a corporation of Michigan
Filed Dec. 6, 1965, Ser. No. 511,811
Int. Cl. A63d 15/08
U.S. Cl. 273—68                   4 Claims

ABSTRACT OF THE DISCLOSURE

A billiard cue having an outside wall which is a tapered fiber glass tube is filled with a composition which includes an organic resin such as polyvinyl chloride, perlite, and sand to provide a properly weighted cue which will be unaffected by moisture and will be extremely durable. The perlite aggregate has a lower density than the resin and the silica sand aggregate a higher density than the perlite so that the total density of the cue may be adjusted to a predetermined value. This results in an evenly distributed mixture of weight according to the taper of the cue tube.

In the drawings:

FIG. 1 is a side view of a billiard cue embodying my invention.

FIG. 2 is an enlarged view with portions broken away to a plane through the axis showing a step in the manufacture of my billiard cue.

FIG. 3 is a view similar to FIG. 2 showing a later step in the manufacture of my billiard cue.

FIG. 4 is a cross sectional view on line 4—4 of FIG. 3 showing the internal structure of the filling of my billiard cue.

My billiard cue consists of a conventional tapered fiber glass tube 10, having a metal ferrule 11 which is fitted with a leather tip 12 for striking a ball. The interior of tube 10 is filled with a mixture of a thermosetting organic resin plastic 13 which is heavier than the desired final density of the billiard cue, a first aggregate 14 of very low density, and a second aggregate of higher density than the first aggregate but lower density than the plastic.

Vinyl is the preferred plastic for filling the billiard cue. The uncured liquid plastic is mixed with twice its volume of the lowest density first aggregate, bringing the density of the mix below the proper density for all but the lightest cues. If the pool cue to be manufactured is to be of the lightest weight and is to be of maximum length, none of the second aggregate is added. To the degree that a heavier cue is desired for a given length, additional aggregate of the second variety is added to bring the density to the desired standard. Thus the density is uniform, giving the cue better feel and balance than can be achieved with discrete weights.

For example, I prefer to use a vinyl plastisol 13 as a filler plastic. Using such a plastisol I add to it two parts by volume of perlite 14, a volcanic glass having generally spherical particles which are partially shattered into generally concentric layers and which contains approximately two to four percent of water. I then add sufficient silica sand 18 to bring the density of the mixture to the desired final value, and mix the ingredients in a conventional mixer.

For instance, a sixteen ounce fifty-seven inch cue does not require that any sand be added to the vinyl and perlite mix. For a sixteen ounce fifty-two inch cue one pint of sand is required to each one gallon of vinyl and two gallons of perlite, while in an eighteen ounce fifty-two inch cue two pints of sand are required in the same quantities of vinyl and perlite.

The plastic used is preferably polyvinyl chloride based polymers and co-polymers dispersed in a liquid plasticizer, in the ratio of 100 parts polyvinyl chloride to 65 parts plasticizer. The plasticizer may be, for instance, dioctyl phthalate. However, other ratios and other plasticizers may be used without difficulty. The perlite is desirably of the grade sold as plaster aggregate. The sand is clean silica sand.

After preparing the mixture of filler ingredients a funnel 15 is placed in the fiber glass tube 10 and sufficient of the filler mix is placed in the funnel to fill the fiber glass tube, which may be from 48 to 57 inches long depending upon the desired size of the billiard cue, to fill tapered tube 10 to within four to five inches of the large end. The smaller end is plugged at the bottom with a cork 16. The consistency of the mix and the size of the opening of funnel 15 are so chosen as to permit the mix to fill the tube in rather large discrete droplets so that the air may escape during filling and the tube fills without voids. When the filler material has reached the level of the bottom of funnel 15 the material will no longer flow into tube 10, at which point the funnel is removed and the cue is cured at 250° Fahrenheit for one half hour, at which time the vinyl will have become a solid mass. Due to the inclusion of the perlite 14 in the filler material this mass expands as shown in FIG. 3 to fill the tube to a considerably higher level than the original level to which it was filled. This expansion is highly desirable because it creates a firm mechanical bond between the tube 10 and the plastisol 13. The cue is then finished by gluing the ferrule 11 and leather tip 12 to the small end, and by gluing a resilient rubber or vinyl cushion 17 in the remaining unfilled portion of the larger end, as shown in FIG. 3.

The vinyl plastisol does not expand during curing and consequently will not bond to the tube 10 as well as my improved filler, which does expand during curing. No chemical interaction occurs between the polyvinyl chloride, the perlite, and the sand. The resultant mass within the fiber glass tube is an evenly distributed mixture in which the weight is properly distributed due to the taper of the tube. The tip of the tube is desirably twelve millimeters in diameter, while the butt ranges from one inch to one and one quarter inches, to accommodate variations in user's preferences.

An epoxy resin flat finish may desirably be used on the surface of the tube to impart the desired appearance.

As used in the claims the term "minor proportion" means less than 50% and the term "major proportion" means more than 50%.

I claim:

1. A billiard cue comprising a tapered fiber glass tube, and a homogeneously weighted filler substantially filling said tube, said filler comprising a minor proportion by volume of an organic resin, a major proportion by volume of a first expandible aggregate having a density substantially lower than that of the resin, and sufficient volume of a second aggregate having a density substantially higher than said first aggregate to adjust the density of the finished cue to a predetermined value.

2. The cue of claim 1 in which said resin comprises polyvinyl chloride, said first aggregate is perlite and said second aggregate is silica sand.

3. The cue of claim 2 in which said filler comprises two parts by volume perlite and one part by volume polyvinyl chloride plastisol.

4. The cue of claim 1 in which said filler is poured into said cue as a thick liquid, which is thereafter cured and expands to form a tight mechanical bond with the inner surface of said tube.

References Cited

UNITED STATES PATENTS

| | | | |
|---|---|---|---|
| 2,051,083 | 8/1936 | Hart | 273—81 |
| 2,768,921 | 10/1956 | Pigg. | |
| 2,950,112 | 8/1960 | Dettman | 273—82 |
| 3,206,201 | 9/1965 | Hendricks. | |
| 3,208,750 | 9/1965 | Firth et al. | 273—63 |
| 3,248,113 | 4/1966 | Baggenstoss et al. | 273—63 |

FOREIGN PATENTS 1,656   1907   Great Britain.

RICHARD C. PINKHAM, Primary Examiner

T. ZACK, Assistant Examiner

U.S. Cl. X.R.

273—80